(12) United States Patent
Stählin et al.

(10) Patent No.: US 8,712,367 B2
(45) Date of Patent: Apr. 29, 2014

(54) METHOD AND SYSTEM FOR PLACING AN EMERGENCY CALL

(75) Inventors: Ulrich Stählin, Eschborn (DE); Peter Rieth, Eltville (DE); Karl-Thomas Neumann, Glashütten (DE)

(73) Assignee: Continental Teves AG & Co. oHG (DE)

( * ) Notice: Subject to any disclaimer, the term of this patent is extended or adjusted under 35 U.S.C. 154(b) by 347 days.

(21) Appl. No.: 12/746,309

(22) PCT Filed: Jun. 17, 2008

(86) PCT No.: PCT/EP2008/057632
§ 371 (c)(1),
(2), (4) Date: Jun. 4, 2010

(87) PCT Pub. No.: WO2009/071343
PCT Pub. Date: Jun. 11, 2009

(65) Prior Publication Data
US 2010/0273446 A1    Oct. 28, 2010

(30) Foreign Application Priority Data

Dec. 6, 2007 (DE) .......................... 10 2007 059 024
Feb. 9, 2008 (DE) .......................... 10 2008 008 371

(51) Int. Cl.
*H04M 11/04* (2006.01)
*H04W 4/22* (2009.01)
*H04W 76/02* (2009.01)
*H04W 76/00* (2009.01)

(52) U.S. Cl.
CPC ................ *H04W 4/22* (2013.01); *H04W 76/02* (2013.01); *H04W 76/007* (2013.01)

USPC ................... 455/404.1; 455/404.2; 455/456.3

(58) Field of Classification Search
CPC ....... H04W 4/22; H04W 64/00; H04W 76/02; H04W 76/003
USPC .......... 455/404.1, 404.2, 412.1, 412.2, 414.1, 455/414.2, 414.4
See application file for complete search history.

(56) References Cited

U.S. PATENT DOCUMENTS

| | | |
|---|---|---|
| 5,625,668 A | 4/1997 | Loomis et al. |
| 6,175,329 B1 | 1/2001 | Vicci |
| 6,337,641 B1 | 1/2002 | Yoshioka et al. |
| 7,133,661 B2 * | 11/2006 | Hatae et al. ................ 455/404.1 |
| 7,174,173 B1 * | 2/2007 | Needham et al. .......... 455/456.2 |
| 2002/0044062 A1 | 4/2002 | Yoshioka |
| 2004/0142678 A1 * | 7/2004 | Krasner .................... 455/404.2 |
| 2005/0118983 A1 * | 6/2005 | Van Camp ................ 455/404.2 |

(Continued)

FOREIGN PATENT DOCUMENTS

| | | |
|---|---|---|
| DE | 10 2005 021 115 | 11/2006 |
| EP | 1 143 400 | 10/2001 |
| EP | 1 280 120 | 1/2003 |
| EP | 1 814 093 | 8/2007 |

*Primary Examiner* — Jean Gelin
(74) *Attorney, Agent, or Firm* — RatnerPrestia

(57) ABSTRACT

An emergency call device for a vehicle is specified in which, on occurrence of a certain event, a data record is generated which thereupon is transmitted during the emergency call. The event can be an external request by an operator or a trigger signal inside a vehicle. In this way, the operator can obtain the most recent information at any time during the emergency call.

12 Claims, 1 Drawing Sheet

(56) References Cited

U.S. PATENT DOCUMENTS

| | | |
|---|---|---|
| 2005/0169248 A1 | 8/2005 | Truesdale et al. |
| 2005/0208925 A1* | 9/2005 | Panasik et al. ............. 455/404.1 |
| 2005/0245272 A1* | 11/2005 | Spaur et al. ................ 455/456.3 |
| 2005/0266879 A1* | 12/2005 | Spaur et al. ................ 455/556.2 |
| 2006/0276200 A1* | 12/2006 | Radhakrishnan et al. . 455/456.1 |
| 2007/0030146 A1* | 2/2007 | Shepherd ................... 340/539.1 |
| 2007/0094045 A1* | 4/2007 | Cobbs et al. ...................... 705/2 |
| 2007/0224941 A1* | 9/2007 | Yoshioka ..................... 455/66.1 |
| 2008/0013484 A1* | 1/2008 | Chang et al. .................. 370/328 |
| 2008/0243545 A1* | 10/2008 | D'Ambrosia et al. ............ 705/2 |
| 2010/0323661 A1* | 12/2010 | Himmelstein ............. 455/404.2 |

\* cited by examiner

METHOD AND SYSTEM FOR PLACING AN EMERGENCY CALL

CROSS REFERENCE TO RELATED APPLICATIONS

This application is the U.S. National Phase Application of PCT International Phase Application No. PCT/EP2008/057632, filed Jun. 17, 2008, which claims priority to German Patent Application No. 10 2008 008 371.2, filed Feb. 9, 2008, and German Patent Application No. 10 2007 059 024.7, filed Dec. 6, 2007, the contents of such applications being incorporated by reference herein.

FIELD OF THE INVENTION

The present invention relates to placing an emergency call from a vehicle in an accident. In particular, the invention relates to a system for placing such an emergency call to a rescue co-ordination center, to a corresponding method and also an associated computer product and a computer-readable medium.

BACKGROUND OF THE INVENTION

The increasing density of motor vehicle traffic on the road network which approaches the limits of extension with regard to its capacity, leads to an increased risk of accidents. Although the risk of accidents can be minimized by means of modern driver assistance systems and the like, it cannot be eliminated. In the case of a traffic accident, rapid help for damaged persons is required. The field of application of the present invention extends to technical accident logistics created for this purpose.

From the general prior art, an automated emergency call system with the designation "eCall" is known in the European region, in which system, in the case of an accident, a message, i.e. this eCall, is transmitted automatically to a rescue co-ordination center. For this purpose, the vehicles are equipped with accident monitoring units. The accident monitoring unit is an electronic unit connected to the vehicle electrical system, to which unit an accident sensor is connected at the input. In the simplest case, the accident sensor can be an acceleration sensor which outputs an accident signal above a predeterminable threshold value of a negative acceleration of the vehicle which is above the negative accelerations caused by the normal braking forces of the vehicle. Following this, the accident monitoring unit determines by the connected positioning system, preferably the GPS positioning system of the vehicle navigation, the current position data of the vehicle. This information is fed automatically in the form of an emergency call to the emergency call center, which clarifies the situation and, if necessary, requests help nationally and internationally. By knowing the precise location of the accident and additional information such as data of persons, time of accident and the like, the rescue forces can act optimally. Apart from an activation of the accident help by automatic sensor system, manual triggering by emergency call key in the vehicle is also provided. In addition, the possibility exists that the rescue co-ordination center can establish a voice contact to the passengers in the vehicle in order to obtain, for example, other information about the severity of the accident. For this purpose, and for placing the emergency call to the rescue co-ordination center, a mobile radio unit is also required which is connected to the accident monitoring unit. Optionally, data transmission of other on-board safety systems such as air bag equipment, safety belt sensor and rollover sensor is possible which provide conclusions to be drawn about the severity of the accident event and the number of passengers.

Such a system and method are disclosed in EP 1 814 093 A1, which is incorporated herein by reference. When the emergency call is triggered, the geographic accident co-ordinates together with identification data of the vehicle, are transmitted in the form of a digital data message digitally from a mobile radio unit via a mobile radio network to the central call unit. The data thus transmitted are processed by the central call unit to form an advisory image and provided on an access-supported Internet page which is provided with graphical map material from which it can be seen where the vehicle is located. In addition, information can be transmitted by a telephone call to a local emergency call answer desk of the vehicle or by a central emergency call answer desk which informs the local rescue co-ordination center by a telephone call. The advisory image is retrieved by the Internet by the locally responsible local rescue co-ordination center after authentication at the Internet server.

The disadvantageous factor in this technical solution is found to be the completely graphical communication by advisory image which complicates the transmission of important additional information because of specified data formats. Furthermore, an Internet access and other equipment are required.

It has already been attempted to include elements of the voice communication, originally practiced as a part of emergency call systems, in modern automatic emergency call systems. In this context, a so-called text-to-speech application finds application in the vehicle. Text-to-speech applications convert text information into voice information which corresponds to a type of automatic reading out of text. It is determined by a positioning system, preferably Global Positioning System (GPS) at which position on a digital map the vehicle in accident is located. This position, comprising street name and house number is converted into speech by means of text-to-speech application, which is then automatically transmitted via a voice channel, preferably by mobile radio to the rescue co-ordination center.

The disadvantageous factor in this technical solution is, however, the associated great technical expenditure in the vehicle. In particular, the accident monitoring unit and the required peripheral electronic units must be able to implement the entire range of functions described above.

SUMMARY OF THE INVENTION

It is an object of the present invention, therefore, to improve a generic method and system for placing an emergency call from a vehicle in an accident to a rescue co-ordination center by text-to-speech method in such a manner that reliable emergency call logistics are ensured with minimum technical expenditure.

An object of the present invention is achieved by a method for placing an emergency call from a vehicle in an accident to a release co-ordination center by a text-to-speech method described herein. The present invention also relates to a system and an associated computer program product whereas a corresponding computer-readable medium is the subject matter.

The invention includes the method-related teaching that, after detection of an accident of the vehicle via a sensor system of an automatic accident monitoring unit in the vehicle and determination of the associated current geographic accident co-ordinates of the vehicle by positioning system, according to aspects of the invention, at least these accident co-ordinates are transmitted to a central call unit for the purpose of correlating these with a digital map centrally stored there, for obtaining a cartographic accident position as text information. This text information about the cartographic accident position determined is subsequently converted by the central call unit into voice information in order to transmit this voice information finally from the central call unit to the rescue co-ordination center by voice channel.

The term "voice conversion" is meant as a media conversion, that is to say the transportation, transformation or conversion of a file from one file format into another one. This applies both to the transfer of data between different media and data systems and to the transmission of data from one storage medium to another one. The text data received are converted, for example, into video data or audio data which can be displayed by many terminals such as, e.g. mobile telephones.

It should be pointed out here that, in the context of the present invention, GPS is representative of all global navigation satellite systems (GMSS) such as e.g. GPS, Galileo, GLONASS (Russia), Compass (China), IRNSS (India), etc. The vehicle is, for example, a motor vehicle such as a car, bus or truck or also a rail vehicle, a ship, an aircraft such as a helicopter or airplane, or for example a bicycle.

An advantage of the solution according to some aspects of the invention consists in that, by shifting the text-to-speech functionality to a central position, the accident monitoring unit in the vehicle does not have to also cover this functionality which simplifies its manufacture. This is because comparatively little computing power is required from the decentralized accident monitoring unit as part of the solution according to some aspects of the invention. The text-to-speech application, running centrally, can also be automated and it is possible to ensure that the map material stored there is always current. Thus, saving the updating of digital maps in the vehicle which is otherwise normally carried out. By converting text information into voice information by means of the central call unit, no technical re-equipment in the direction of communication to the rescue co-ordination center is necessary. Conventional voice channels can therefore still be used, rendering any modification of the technical equipment of the rescue co-ordination center unnecessary.

In the context of the present invention, geographic accident co-ordinates are understood to be a data record which only contains longitude and latitude degree information with respect to a terrestrial co-ordinate system. These are preferably the co-ordinates which are output by a GPS unit. In contrast, the term cartographic accident position is here understood to be a type of postal address such as country, town, street, house number or milestone on freeways. Such a cartographic accident position could correspond to the output information of a vehicle navigation system. The rescue co-ordination center is here understood to be, for example, the accident station of a hospital which is equipped with communication technology in order to forward incoming accident messages to operation vehicles so that these can provide assistance at the accident location. A rescue co-ordination center can also be of a mobile nature in that it is directly set up in an operation vehicle. A network of such rescue co-ordination centers with defined territorial responsibility forms an organizational prerequisite for guaranteeing rapid accident assistance.

According to a measure of the present invention it is proposed that after the voice information has been transmitted from the central call unit to the rescue co-ordination center, a direct voice channel is established from the latter to the vehicle in the accident. Via this channel, the rescue co-ordination center can then obtain further detailed information directly, that is to say bypassing the central call unit, in order to plan the severity of the accident and the required aid measures.

In the reverse direction of information, it is also conceivable to establish a provisional voice channel from the vehicle in the accident to the central call unit during the transmission of the voice information from the central call unit to the rescue center so that further messages of the vehicle passengers to the rescue forces can be placed via this channel, for example with regard to the number of persons in the accident, type of damages, degree of damages and additional aid measures such as fire department, police and the like. The central call unit then forwards this information to the responsible rescue co-ordination center. For this purpose, the central call unit is preferably occupied by an operator that is to say a person for receiving and forwarding this additional voice information. This functionality may also be handled by a call center service provider.

As an alternative, it is also conceivable that the vehicle passengers can conduct messages to an automated rescue co-ordination center which, comparably to a call answering function, temporarily stores the voice messages in order to forward these immediately to the rescue co-ordination center, for example by automatically calling and replaying the memory content or also automatically directly after the voice conversion similar to a so called "time shift" function in the case of video recorders.

With regard to the system, a computer server forms the core component for the central call unit. This computer server comprises a navigation application unit with a connected central digital map for converting the geographical accident co-ordinates into the cartographic accident position. In addition, the required text-to-speech application can also be implemented in this computer server so that the central call unit can also perform the conversion of text information about the accident position into voice information in this way. As an alternative, it is also conceivable to implement the text-to-speech application manually in that an operator handles this task. This makes sense mainly in the sense of an organizational safety measure for the response to a failure of the automatic text-to-speech application.

At the same time, the operator can also be active for the rescue co-ordination center for provisionally receiving messages of the vehicle passengers from the vehicle in the accident.

Whilst the positioning system in the vehicle can be based on the global positioning system (GPS) in order to obtain the geographic accident co-ordinates, it is proposed that the digital map which, on the basis of this, then obtains the cartographic accident position, is updated in short time intervals—preferably daily.

Advantageously, dynamic traffic information about road blockages and the like are also taken into consideration apart from the digital map containing static traffic information about courses of streets, street names and the like. This enables the central call unit to transmit to the rescue co-ordination center, if necessary, a reachable address which is possibly close to the actual accident location. As an alternative, this functionality can also be handled by a dynamic route guidance of the rescue vehicle.

According to another aspect of the present invention, it is proposed that the voice channel between the central call unit and the rescue co-ordination center is a mobile radio network if the rescue co-ordination center is accommodated in a vehicle. If, in contrast, the rescue co-ordination center is settled in a building, the landline network could be used which usually offers a more stable information transmission capability.

Aspects of the invention may also be embodied as a computer program product which, when executed on a processor of the central call unit instructs the software of the processor to carry out the associated method steps which are the subject matter of the invention.

In this context, a computer-readable medium is also the subject matter of the invention on which a computer program product described above is stored retrievably.

BRIEF DESCRIPTION OF THE DRAWINGS

The invention is best understood from the following detailed description when read in connection with the accompanying drawings. In the text which follows, further descriptions of the invention are represented in greater detail, together with the description of a preferred exemplary embodiment of the invention. Included in the drawings are the following figures.

The representations in the figures are diagrammatic and not to scale.

DETAILED DESCRIPTION

Figure 1:
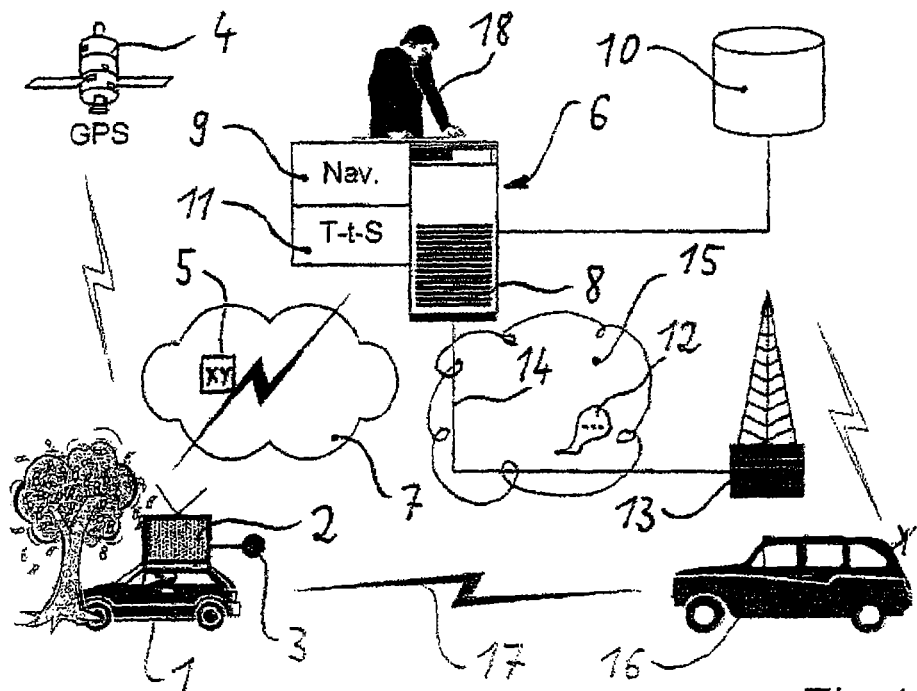
FIG. 1 shows a diagrammatic representation of a system for placing an emergency call from a vehicle in an accident to a rescue co-ordination center.

According to FIG. 1, a vehicle 1 in an accident contains an accident monitoring unit 2 which, constructed as electronic box, is connected to the on-board electrical system of the vehicle 1 for the purpose of voltage supply. The accident monitoring unit 2 is connected to a sensor system 3 which detects the accident event. Triggered by this, the geographic co-ordinates of the vehicle 1 are detected by the accident monitoring unit 2 by a positioning system 4 which is constructed as GPS. From the vehicle 1, the geographic accident co-ordinates 5 are subsequently sent as a data record to a central call unit 6 by mobile radio 7.

The central call unit 6 in this case consists of a computer server 8 with a navigation application unit 9 to which a central digital map 10 is connected. Furthermore, a text-to-speech application unit 11 is implemented in the computer server 8.

The central call unit 6 determines from the geographic accident co-ordinates 5 received the cartographic accident position 12 in the form of a postal address by utilizing the navigation application 9 with connected central digital map 10. This text information is converted by the text-to-speech application unit 11 into a voice information 12 in order to transmit the voice information 12 by voice channel 14 from the central call unit 6 to a rescue co-ordination center 13.

In this exemplary embodiment, the voice channel 14 is connected via a landline network 15, in this case a normal telephone network, since both the call unit 6 and the rescue co-ordination center 13 are accommodated immobile in a building. The rescue co-ordination center 13 co-ordinates the deployment of the rescue vehicle 16. This is additionally capable of establishing direct contact with the passengers of the vehicle 1 via a voice channel 17 which can also be connected by mobile radio network 7.

In addition, there is the possibility that the passengers of the vehicle at least provisionally also receive messages from the vehicle passengers in the period during the transmission of the accident co-ordinates 5 to the call unit 6 and its activity for alarming the rescue co-ordination center 13 in order to subsequently forward the messages to the rescue co-ordination center 13. Since such messages of the vehicle passengers of the vehicle 1 take place by voice communication, an operator 18 is allocated to the call unit 6 for fulfilling this switching activity. As a result, the passengers of the vehicle 1 are capable of manually requesting help or placing accident-related additional information independently of the automatic system.

Figure 2:
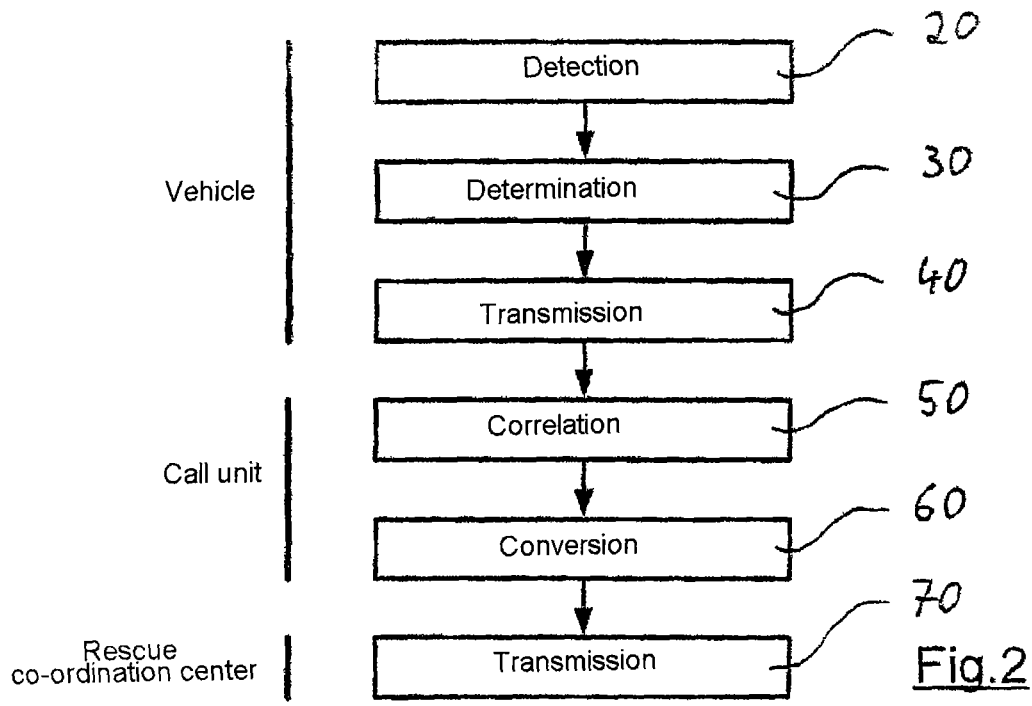
FIG. 2 shows a flow chart of a method, carried out via the system according to FIG. 1 for placing the emergency call.

According to FIG. 2, the system for placing an emergency call, described above, operates in accordance with the sequence of the following method steps:

Firstly, a detection 20 of an accident takes place by the monitoring unit integrated in the vehicle. Subsequently, a determination 30 of the current geographic accident co-ordinates of the vehicle is performed by GPS in order to subsequently carry out a transmission 40 of these accident co-ordinates to a central call unit which performs a correlation 50 of these with a digital map centrally stored there in order to determine a cartographic accident position as text information in the form of an address. The central call unit subsequently performs a conversion 60 of the text information about the cartographic accident position determined into voice information in order to finally transmit this by voice channel by transmission 70 from the central call unit to a rescue co-ordination center.

According to aspects of the invention, the invention is not restricted to the representations in the exemplary embodiment described above. Instead, modification thereof are also conceivable which are also comprised in the scope of the subsequent claims. Thus, it is also possible, for example, to operate the central call unit fully automatically, i.e. without operator in order to generate voice information to the responsible rescue center from the accident co-ordinates received at the input. In addition, according to aspects of the invention, the invention is flexible with regard to the telecommunication networks. For example, the rescue co-ordination center can also be integrated mobile on a vehicle so that the mobile radio network is also suitable for transmitting the voice information from the call unit to the rescue co-ordination center, which is mobile to this extent.

It should be pointed out additionally that "comprising" and "having" does not exclude any other elements or steps and "one" does not exclude a multiplicity. Furthermore, it should be pointed out that features or steps which have been described with reference to one of the above exemplary embodiments can also be used in combination with other features or steps of other exemplary embodiments described above.

The invention claimed is:

1. A method for placing an emergency call from a vehicle in an accident to a rescue co-ordination center by text-to-speech method, comprising the steps:
    detecting an accident of the vehicle by a sensor system of an automatic accident monitoring unit in the vehicle, and in response to a detected accident:
        determining geographic accident co-ordinates of the vehicle by a positioning system,
        transmitting at least the accident co-ordinates to a central call unit processor, the central call unit processor correlating the accident coordinates with a digital map to determine a cartographic accident position as text information,
        converting the text information of the cartographic accident position into voice information by the central call unit processor, and transmitting the voice information from the central call unit to the rescue co-ordination center over a voice channel, transmitting the voice information from the rescue coordination center to a rescue vehicle, and automatically establishing, by the rescue coordination center, a voice channel between the vehicle in the accident and the rescue vehicle.

2. The method as claimed in claim 1, further comprising establishing a direct voice channel from the rescue co-ordination center to the vehicle in the accident.

3. The method as claimed in claim 1, wherein transmitting the voice information from the central call unit to the rescue co-ordination center further comprises establishing a provisional voice channel for transmitting messages of the vehicle passengers from the vehicle in the accident to the central call unit.

4. The method as claimed in claim 1, wherein transmitting the voice information from the central call unit to the rescue co-ordination center further comprises temporarily storing messages of the vehicle passengers by the vehicle in an accident in order to forward these to the rescue co-ordination center after completed transmission of the voice information.

5. A system for placing an emergency call from a vehicle in an accident to a rescue co-ordination center by text-to-speech method, comprising:

a processor configured to:
  detect an accident of the vehicle by a sensor system, and in response to a detected accident determine the current geographic accident co-ordinates of the vehicle, transmit the accident co-ordinates to a central call unit processor for correlating the accident coordinates with a digital map stored there centrally, to obtain a cartographic accident position as text information which is converted by the central call unit processor into voice information in order to transmit the voice information over a voice channel to the rescue co-ordination center,
  wherein the rescue coordinator center transmits the voice information to a rescue vehicle, and automatically establishes a voice channel between the vehicle in the accident and the rescue vehicle.

6. The system as claimed in claim 5, wherein the central call unit comprises a computer server having a navigation application unit with connected central digital map and text-to-speech application unit.

7. The system as claimed in claim 5, wherein at least one operator for transmitting the voice information from the central call unit to the rescue co-ordination center or for provisionally receiving messages of the vehicle passengers from the vehicle in the accident for the rescue co-ordination center is allocated to the computer server.

8. The system as claimed in claim 5, wherein the positioning system in the vehicle accesses a global satellite navigation system for obtaining the geographic accident co-ordinates.

9. The system as claimed in claim 8 wherein the positioning system in the vehicle accesses a global positioning system for obtaining the geographic accident co-ordinates.

10. The system as claimed in claim 5, wherein the voice channel between the central call unit and the rescue co-ordination center is set up by a mobile radio network.

11. The system as claimed in claim 5, wherein the voice channel between the central call unit and the rescue co-ordination center is set up via a landline network.

12. A non-transitory computer-readable medium on which a computer program product is stored which, when it is executed on a processor of a central call unit as claimed in claim 5 instructs the processor to carry out the following steps:

correlating the received accident co-ordinates with a centrally stored digital map for obtaining a cartographic accident position as text information, converting the text information about the cartographic accident position determined into voice information, and transmitting the voice information by voice channel from the central call unit to the rescue co-ordination center.

\* \* \* \* \*